United States Patent [19]

Beauviala

[11] 4,235,534
[45] Nov. 25, 1980

[54] DEVICE FOR DRIVING THE CLAW SHAFT OF A MOTION PICTURE CAMERA

[75] Inventor: Jean-Pierre Beauviala, Grenoble, France

[73] Assignee: Aaton S.A., Grenoble, France

[21] Appl. No.: 14,278

[22] Filed: Feb. 23, 1979

[51] Int. Cl.³ .............................................. G03B 1/22
[52] U.S. Cl. .................................. 352/191; 352/180; 352/192
[58] Field of Search ............... 352/191, 192, 193, 180, 352/187; 226/70, 71

[56] References Cited
U.S. PATENT DOCUMENTS

| | | | |
|---|---|---|---|
| 2,406,152 | 8/1946 | Levine | 352/193 |
| 3,692,394 | 9/1972 | Bauer | 352/180 |
| 3,819,258 | 6/1974 | Butler et al. | 352/187 |
| 4,022,525 | 5/1977 | Boudouris | 352/187 |

Primary Examiner—Monroe H. Hayes
Attorney, Agent, or Firm—Oblon, Fisher, Spivak, McClelland & Maier

[57] ABSTRACT

A device for driving the claw shaft of a motion picture camera, comprises an electric motor coupled to the claw shaft itself connected to said claw by a mechanism of the crank-connecting rod system type, for converting the movement of rotation of the electric motor into a movement of reciprocating translation.

Means are provided for modulating the speed of rotation of the claw shaft as a function of the angle of rotation thereof with respect to a reference position, so that the speed of the claw at the moment of its engagement in a perforation of the film is as low as possible and that this speed then increases, during the descent of the film, according to a law such that the acceleration communicated to the film causes only a minimum stress exerted on said latter.

12 Claims, 6 Drawing Figures

DEVICE FOR DRIVING THE CLAW SHAFT OF A MOTION PICTURE CAMERA

BACKGROUND OF THE INVENTION

The present invention relates to a device for driving the claw shaft of a motion picture camera.

Heretofore known motion picture cameras generally comprise devices for driving the film by means of a claw animated by a reciprocating movement. These drive devices use a composite of mechanical movements to ensure a suitable law of penetration of the claw in the perforations of the film, followed by a descent of this claw taking the film with it downwardly, then by a rise of the claw released from said perforations. Certain known drive devices use cam and crank-connecting rod systems which do not all satisfy the ideal laws and which are driven by a motor with continuous movement.

Other known devices drive the film by mechanisms connected to motors of the stepping type which produce vibrations and consequently noises which are incompatible with the use of cameras recording sound at the same time as filming.

SUMMARY OF THE INVENTION

It is an object of the present invention to remedy these drawbacks by providing a drive device with a mechanism of the crank-connecting rod system type producing virtually no noise while ensuring an optimum law of displacement of the claw in the conditions of use.

To this end, this device for driving the claw shaft of a moving picture camera, comprising an electric motor coupled to the claw shaft itself connected to this claw by a mechanism of the crank-connecting rod system type, to convert the movement of rotation of the electric motor into a movement of reciprocating translation of the claw, is characterized in that it comprises means for modulating the speed of rotation of the claw shaft, as a function of the angle of rotation thereof with respect to a reference position, so that the speed of the claw at the moment of its engagement in a perforation of the film is as low as possible and that this speed then increases, as the film descends, according to a law such that the acceleration communicated to the film causes only a minimum stress exerted on the latter.

The drive device according to the invention thus makes it possible to obtain an engagement at very low speed of the claw in a perforation of the film, hence providing suppression of any violent shock on the edge of said perforation, and the time thus lost during this engagement is then made up during the descent of the film during which the speed increases progressively according to an optimum law avoiding too considerable stresses on the film.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
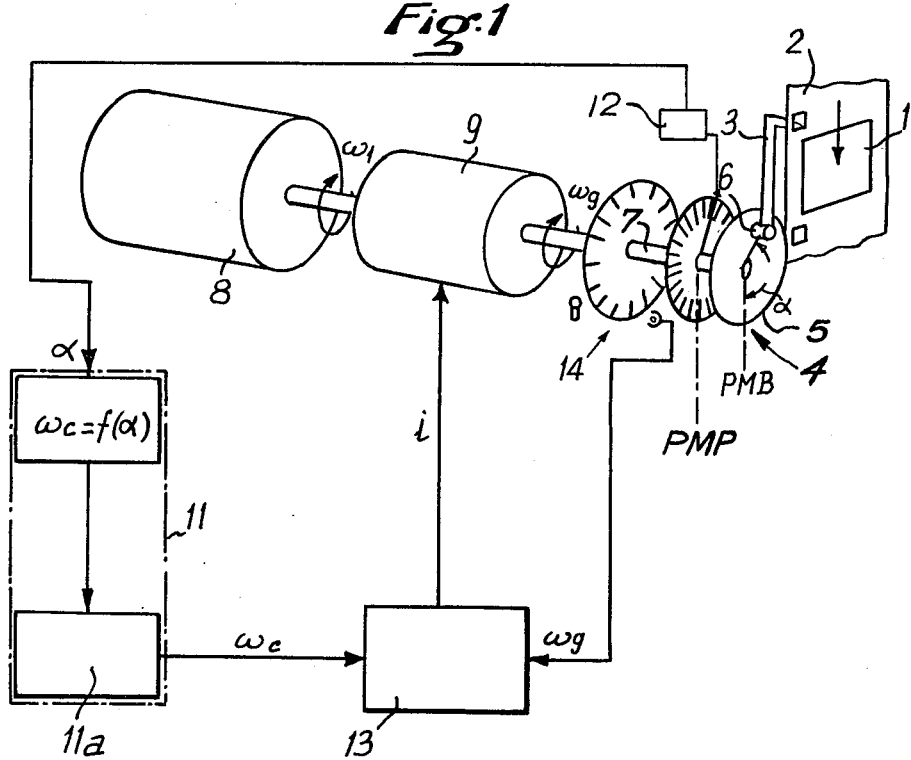
FIG. 1 is a block diagram of a device for driving the claw shaft of a motion picture camera according to the invention, at variable speed.

Referring now to the drawings, FIG. 1 shows the motion picture camera solely by a film gate 1 which is made, in known manner, in a plate behind which a film 2 moves vertically and step by step. This film is driven downwardly by means of a claw 3 of which the end forming hook is engaged in the successive lateral perforations of the film 2. The claw 3 constitutes the connecting rod of a mechanism of the crank-connecting rod system type, designated as a whole by 4 and which essentially comprises a plate 5 carrying a pin 6 on which is pivoted the base of the connecting rod 3 constituting the claw. The plate 5 of the mechanism 4 is fixed on a claw shaft 7 which is rotated, at the angular speed $\omega g$ by an electric motor 8 rotating at constant speed $\omega_1$ via a coupler 9. The coupler 9 is provided in order to transmit to the claw shaft 7, i.e. to the plate 5 of the crank-connecting rod mechanism 4, only the energy sufficient for the angular speed $\omega g$ of the connecting rod base 6 to follow a law imposed by a generator 11 of function $\omega_c = f(\alpha)$, $\alpha$ being the angle of the connecting rod base 6 with respect to a reference position, for example the bottom dead center PMB of the movement of the connecting rod base 6 of the crank-connecting rod mechanism 4. To this end, the input of the function generator 11 is connected to the output of a pick up 12 detecting at any instant the value of the angle $\alpha$, for example by counting pulses due to the movement of slots or opaque zones of a measuring wheel fixed to the claw shaft 7.

The function generator 11 comprises an oscillator 11a which delivers at its output a periodic reference signal $\omega_c$ of which the frequency is modulated according to the above-mentioned law. This signal is applied to an input of a comparator 13 having two inputs, which comparator receives, on its second input, the signal $\omega_g$ representing the angular speed of the claw shaft 7 and which is emitted by a tachometric generator 14. Thus, the comparator 13 continuously compares the instantaneous frequency of the signal $\omega_g$ delivered by the tachometric generator 14 with that of the reference signal $\omega_c$. The output signal of the comparator 13, which depends on the difference between the frequencies of signals $\omega_g$ and $\omega_c$, serves as signal controlling the coupler 9 which may be of the magnetic, electromagnetic or mechanical type. This signal is used for varying the rate of slide inside the coupler 9 and consequently for correlatively modulating the output speed $\omega_g$ of the coupler and to annul the output signal of the comparator 13.

In the case of a coupler 9 of the electromagnetic type, the output signal of the comparator 13 is an electric current of variable intensity i which serves to monitor the magnetic friction of a powder maintained in variable cohesion between a driving disc fixed to the electric motor and a driven drum fixed to the claw shaft 7.

Figure 2:
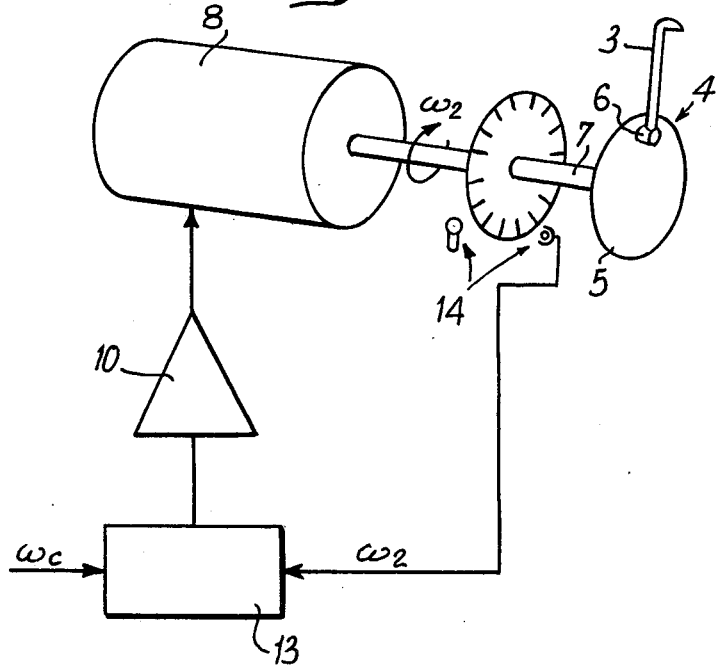
FIG. 2 is a partial block diagram of a variant embodiment.

In the variant embodiment shown in FIG. 2, the electric motor 8 directly drives the claw shaft 7 fixed to the plate 5 of the crank-connecting rod mechanism 4. The tachometric generator 14 delivers a signal $\omega_2$ which represents the speed of rotation of the claw shaft 7 and which is applied to an input of the comparator 13. This comparator receives, as in the case of FIG. 1, the reference signal $\omega_c$ and the output signal of the comparator 13, amplified by an amplifier 10, is applied directly to the electric motor 8. The speed of rotation $\omega_2$ of this latter is therefore directly modulated by the function $\omega_c = f(\alpha)$ The generation of the reference function $\omega_c = f(\alpha)$ may be obtained by the digital frequency generator 11 directly controlled by the digital position pick up 12 which causes an instantaneous frequency $F_i = N_i \times \overline{F}$ to correspond to any digitally indexed position, $\overline{F}$ being the frequency proportional to the filming cadence and $N_i$ being such that $(1/N)\Sigma N_i$ one revolution is equal to 1, the number of pulses per revolution being constant.

Figure 3:
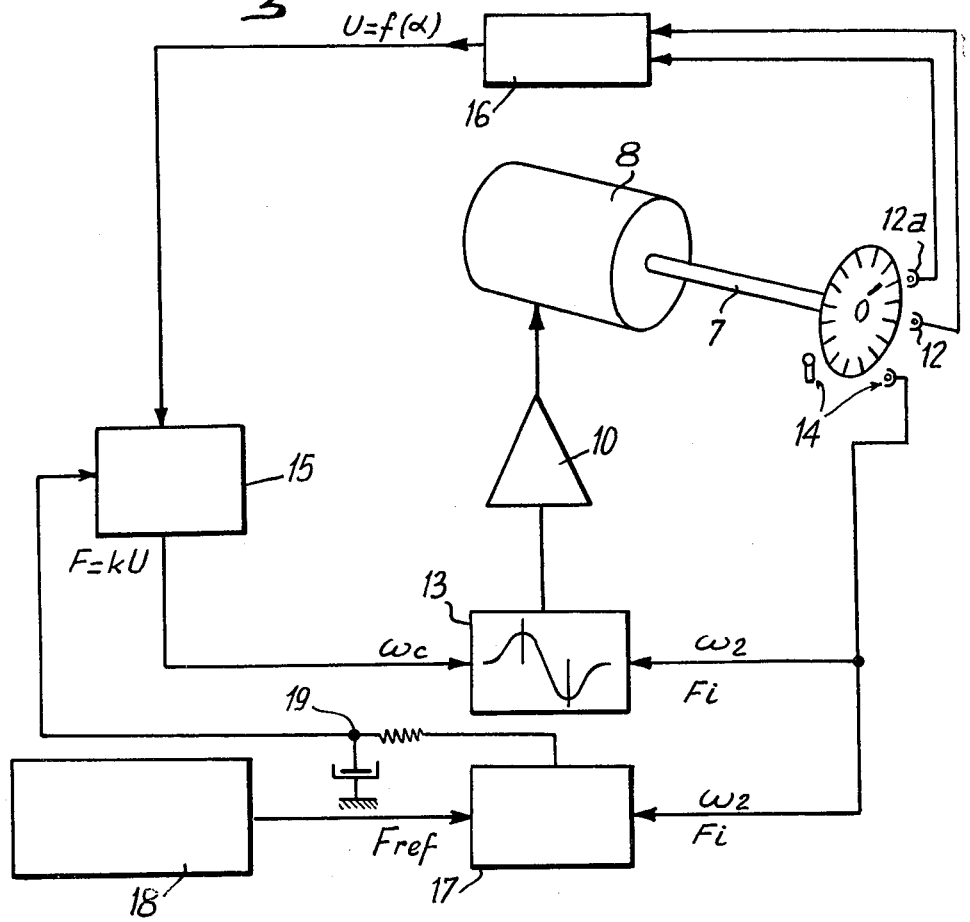
FIG. 3 is a block diagram of another variant embodiment.

In the variant embodiment illustrated in FIG. 3, the generation of the function $\omega_c = f(\alpha)$ is constituted by a voltage-to-frequency converter (F = k U) 15 of which the control voltage is obtained by a generator 16 of voltage $U = f(\alpha)$. This generator 16 is connected to the angular position pick up 12, emitting a signal corresponding to the instantaneous value of the angle $\alpha$, and with which is associated an auxiliary pick up 12a emitting on each revolution a signal for returning the voltage generator 16 to zero.

The device shown in FIG. 3 also comprises means enabling the mean value $\overline{F}_i$ of the frequency to be maintained equal to an indexed value $F_{ref}$. These means comprise a second comparator 17 which receives at its input the signal of instantaneous frequency $F_i$, representing the speed of rotation of the claw shaft 7, and at a second input a signal of constant reference frequency $F_{ref}$ emitted by a quartz oscillator 18. The output of the second comparator 17 delivers a correction voltage integrated by an integrator circuit 19 and which is applied to a control input of the voltage-to-frequency converter 15. This integrated voltage thus ensures a mean polarization such that $\overline{F}_i = F_{ref}$.

Figure 4:
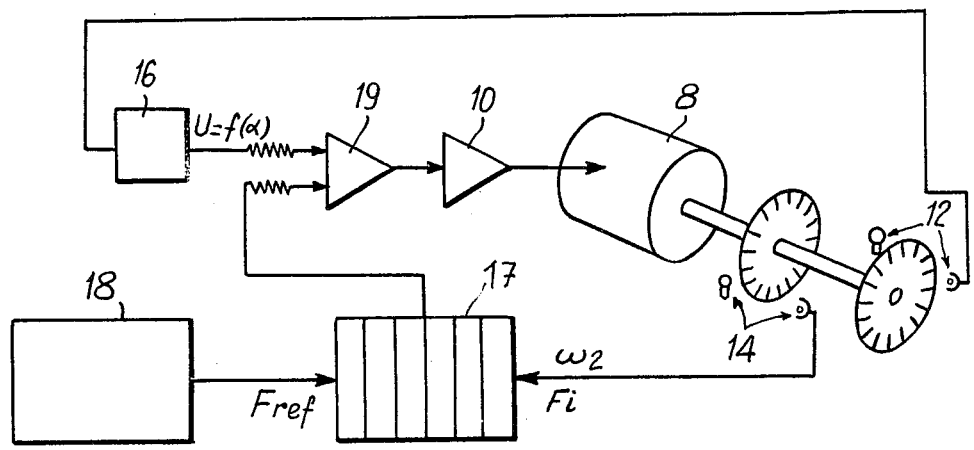
FIG. 4 is a block diagram of another variant.

In the variant embodiment illustrated in FIG. 4, the output voltage of the second comparator 17 is applied to an input of an amplifier 20 receiving on a second input the signal $U = f(\alpha)$ emitted by the generator 16. The output of this amplifier 19 is in turn connected to the input of the amplifier 10 of which the output signal directly supplies the electric motor 8.

In a camera where the advance of the film is jerky, the film gate must be obturated during the time used for ensuring the descent of the film by one step. If the angle of obturation of the shutter is varied for any reason, the time available for this descent of the film may therefore be more or less long. As it is advantageous to stress the film as little as possible during its descent the lowest possible pulling forces must be applied thereto, therefore all the obturation time must be used for accelerating then decelerating the film. Consequently the law $\omega_c = f(\alpha)$ depends on the shutter angle chosen.

According to a complementary feature of the invention, it is therefore provided to display on the camera, due to a digital display means, on the one hand the filming cadence and on the other hand the shutter angle chosen, for example 188°, 180°, 216° which are characteristic values and which may of course be different. To each of the values thus displayed of the angle of the shutter, there corresponds a law $f_{180}$, $f_{216}$, $f_{188}$ stored in a suitable electronic circuit and which causes to correspond to any instantaneous value of the angle $\alpha$, either a speed $\omega_c(180)$ defined by law $f_{180}$, a speed $\omega_c(188)$ defined by the law $f_{216}$, or finally a speed $\omega_c(216)$ defined by the law $f_{216}$.

Figure 6:
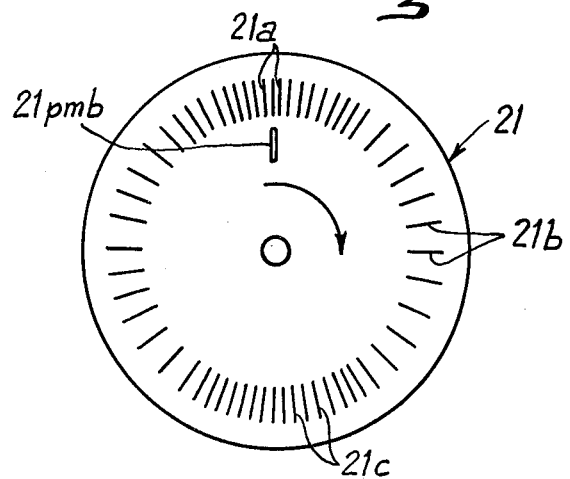
FIG. 6 is a view in elevation of a tachometric wheel used in the device of FIG. 5.

The devices which have been described hereinabove impose on the claw shaft 7 a variable rotating speed by applying to an input of the comparator 13a modulated reference frequency corresponding to a speed $\omega_c$ but, according to a variant embodiment, it may also be provided to apply a constant reference frequency and to mount on the claw shaft 7 a tachometric wheel 21 with variable spacing between the marks or indices corresponding to the measurements, as is shown in FIG. 6. This figure shows that the tachometric wheel 21 bears an isolated mark $21_{pmb}$ which, upon passage in front of a photoelectric cell, provokes the emission of a reference pulse corresponding to the bottom dead centre of the claw 3. The tachometric wheel also bears a series of other marks disposed concentrically in a ring with variable intervals therebetween. More particularly, the wheel 21 comprises a first group of references $21a$ disposed on either side of the bottom dead centre mark $21_{pmb}$ and which correspond to a deceleration (progressive reduction of the intervals between the marks) then to an acceleration (progressive increase of the intervals). These marks $21a$ are followed by other marks $21b$ with constant intervals which correspond to a zone of average speed. These are followed by other marks $21c$ corresponding to a deceleration zone, for example when the claw 3 engages in a perforation of the film.

In this way, the law $\omega_c = f(\alpha)$ is directly inscribed in definitive manner on the tachometric wheel 21 of the device. This assembly leads to a much more simple diagram of the electronic circuits but it is not as suitable when seeking the best function $\omega_c = f(\alpha)$ As in the preceding cases, the signal $\omega_g$ emitted by the pick up 14 is applied to an input of the comparator 13 which receives on its other input a reference signal $\omega_{ref}$ of constant frequency emitted by an oscillator 18. The output signal of the comparator 13 is used for controlling the speed of rotation of the electric motor 8 in the manner described hereinbefore.

To enable the law of variation of the angular speed to be chosen as desired, the tachometric wheel 21 may be arranged to be detachably mounted so that, at each change of shutter angle, the wheel most appropriate for the law of traction of the claw 3 imposed by the chosen shutter angle, may be rapidly installed.

In the camera according to the invention, the shutter 22 which moves in front of the film gate 1 (FIG. 5) rotates at constant speed. It is therefore not possible to drive it from the motor 8 driving the claw 3 since the speed of the claw shaft 7 is modulated in the manner described previously. Consequently in the camera according to the invention, the shutter 22 is driven in rotation by an independent motor 23 which is controlled by a phase synchronisation device 24. This device 24 receives, at one of its inputs, a first pulse A which is emitted by a generator 25 detecting the passage of the shutter in a predetermined position. For example, the generator 25 may emit the pulse A each time that the leading edge 22a of the shutter 22 passes in front of the film gate 1.

The phase synchronisation device 24 receives on a second input a pulse B which is emitted by a pulse generator 26 each time that the plate of the crank 5 passes, during a revolution, in a determined position. For example, the pulse generator 26 may emit a pulse B when the pin 6 constituting the base of the connecting rod 3 forming claw passes to bottom dead centre.

This phase synchronisation is obtained extremely rapidly by means of the device 24 which measures the phase difference between the two pulses A and B, this being translated by a number of pulses stored in a counter, this device then returning the shutter 22 into an angular position such that the number of pulses abandoned or gained on the tachometric wheel 21 fast with the crank plate 5 is equal to that stored upon measurement of the phase difference between the two pulses A and B.

Although, in all the embodiments of the invention which have been described hereinabove, D.C. motors are used for driving the claw 3, stepping motors may also be used to this end. In this case, the pulses corresponding to the speed of rotation would be sent directly to the stepping motor without passing through the speed servocontrol loop constituted by the frequency and phase comparators.

Figure 5:
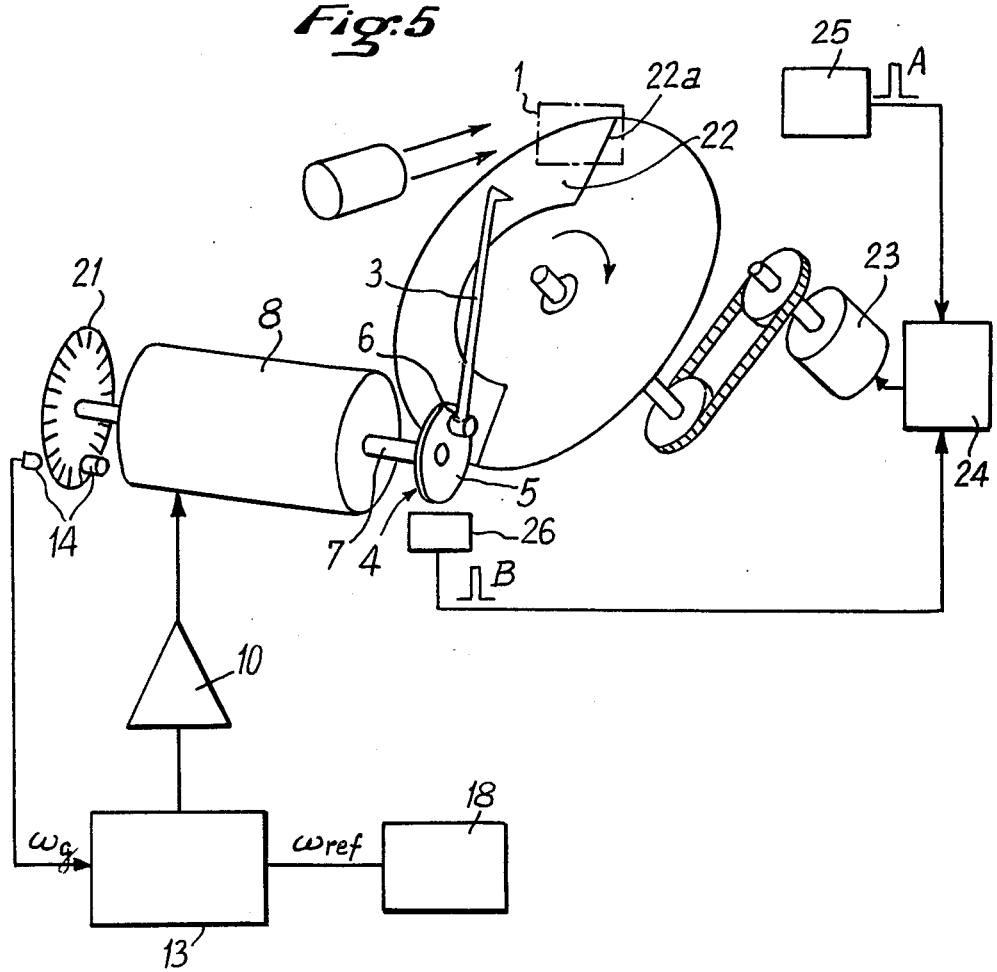
FIG. 5 is a block diagram of a variant embodiment in which the law of variation of the speed is pre-recorded on a tachometric wheel.

In the embodiment of the invention illustrated in FIG. 5, the fact that the shutter 22 is driven by an independent motor 23 may be used to rotate solely this shutter 22, without driving the film by the motor 8, with a view to effecting a measurement of light flux passing through the lenses, this avoiding wasting the film during the sampling.

What is claimed as new and desired to be secured by Letters Patent of the United States is:

1. A device for driving the claw shaft of a motion picture camera, said device comprising:
   a reciprocating claw engageable with a film perforation;
   a rotatable claw shaft;
   means connected between said claw shaft and said claw for converting the rotary motion of said claw shaft into reciprocating motion of said claw;
   an electric motor connected to said claw shaft;
   control means for said motor, said control means modulating the speed of rotation of the claw shaft as a function of the angle of rotation of said claw shaft with respect to a reference position, said control means including means for delivering a periodic reference signal whose frequency is modulated as a function of the angle of said claw shaft, said means for delivering including means for storing and selecting at least two types of reference signals, each of said at least two types of reference signals corresponding to an angle of obturation of the camera shutter.

2. A device for driving the claw shaft of a motion picture camera, said device comprising:
   a reciprocating claw engageable with a film perforation;
   a rotatable claw shaft;
   means connected between said claw shaft and said claw for converting the rotary motion of said claw shaft into reciprocating motion of said claw;
   an electric motor connected to said claw shaft;
   control means for said motor, said control means modulating the speed of rotation of the claw shaft as a function of the angle of rotation of said claw shaft with respect to a reference position, said control means comprising a function generator delivering a periodic reference signal whose frequency is modulated as a function of the angle of said claw shaft, a tachometric generator producing a measuring signal corresponding to the instantaneous value of the speed of rotating of said claw shaft, a comparator having said periodic reference signal and said measuring signal as its inputs and having as its output a control signal corresponding to the difference between said input signals, and means for adjusting the speed of rotation of said claw shaft as a function of said control signal so as to annul said control signal,
   whereby the speed of said claw may be minimized at the beginning and end of the reciprocation stroke.

3. The device of claim 2, wherein it comprises, between the motor and the claw shaft, a coupler to which is applied the control signal delivered by the comparator.

4. The device of claim 3, wherein the coupler is of the electromagnetic type and the control signal delivered by the comparator is an electric current of variable intensity.

5. The device of claim 2, wherein the electric motor is coupled directly to the claw shaft and the output of the comparator is connected to this motor via an amplifier.

6. The device of claim 2, wherein the function generator is constituted by a frequency generator controlled by a digital position pick-up which causes an instantaneous frequency $F_i = N_i \times \overline{F}$ to correspond to any angular position of the digitally indexed claw shaft, $\overline{F}$ being the frequency proportional to the filming cadence and $N_i$ being such that $1/N \Sigma N_i$ on one revolution, is equal to 1, the number of pulses per revolution being constant.

7. The device of claim 2, wherein the function generator is constituted by a voltage to frequency converter of which the input control voltage is delivered by a generator of voltage $U = f(\alpha)$ connected to the claw shaft.

8. The device of claim 7, further comprising a second comparator connected at one of its inputs to the tachometric generator and, at its other input to an oscillator delivering a reference signal at constant frequency, the output of the second comparator being connected, via an integrator circuit, to a control input of the voltage to frequency converter to apply to this latter a correction voltage imposing on the voltage to frequency converter a mean polarization such that the mean value of the instantaneous frequency $F_i$ of the signal emitted by the tachometric generator is equal to the reference frequency of the signal emitted by the oscillator.

9. The device of claim 7, further comprising a second comparator of which one input is connected to the tachometric generator and the other to an oscillator emitting a reference signal of constant frequency, the output of this second comparator being connected to an input of an amplifier of which the other input is connected to the output of the voltage to frequency converter, the amplifier being connected, via an intermediate amplifier, to the electric motor.

10. A device for driving the claw shaft of a motion picture camera, said device comprising:
   a reciprocating claw engageable with a film perforation;
   a rotatable claw shaft;
   means connected between said claw shaft and said claw for converting the rotary motion of said claw shaft into reciprocating motion of said claw;
   an electric motor connected to said claw shaft;
   control means for said motor, said control means modulating the speed of rotation of the claw shaft as a function of the angle of rotation of said claw shaft with respect to a reference position, said control means comprising a tachometric wheel fixed to the shaft of said motor, said tachometric wheel including indices thereon at variable intervals corresponding to a function of the angle of rotation of said motor shaft, said control means further comprising a tachometric generator for detecting the passage of said indices and converting them into periodic reference signals, an oscillator emitting a constant frequency reference signal, a comparator providing an output and having said periodic reference signals and said constant frequency reference signals as its inputs, and an amplifier connected between said comparator output and said electric motor to control the speed of rotation of said claw shaft as a function of the output of said comparator.

11. The device of claim 10, wherein the tachometric wheel is detachably mounted on the claw shaft so as to be able to mount on this shaft the tachometric wheel having inscribed thereon the law of modulation of the speed corresponding to the shutter angle of the chosen shutter.

12. A device for driving the claw shaft of a motion picture camera, said device comprising:

a reciprocating claw engageable with a film perforation;

a rotatable claw shaft;

means connected between said claw shaft and said claw for converting the rotary motion of said claw shaft into reciprocating motion of said claw;

an electric motor connected to said claw shaft;

control means for said motor, said control means modulating the speed of rotation of the claw shaft as a function of the angle of rotation of said claw shaft with respect to a reference position, said control means comprising an independent motor for separately driving the shutter, a first pulse generator emitting a first pulse each time that the shutter passes in a predetermined position, a second pulse generator emitting a second pulse when a point of the plate of the crank-connecting rod system passes into a predetermined position, and a phase synchronization device with two inputs respectively connected to the first and second pulse generators and of which the output is connected to the independent electric motor driving the shutter.

* * * * *